United States Patent Office 3,352,661
Patented Nov. 14, 1967

3,352,661
DEFOLIATION OF PLANTS WITH FATTY
ALKYL ISOTHIOCYANATES
Herbert Q. Smith, Trenton, N.J., assignor to Pennsalt
Chemical Corporation, Philadelphia, Pa., a corporation
of Pennsylvania
No Drawing. Filed Feb. 7, 1964, Ser. No. 343,232
7 Claims. (Cl. 71—72)

ABSTRACT OF THE DISCLOSURE

The process of contacting plants with a defoliating amount of a compound of structure of R—NCS where R is an alkyl radical containing from 10 to 18 carbon atoms.

The defoliation of plants and crops is of high economic importance in agricultural and forestry operations. Defoliation of plants is desirable to increase the value of the crops from such plants either by hastening maturity and/or improving the grade of the fruit. In the case of cotton plants, for example, defoliation at the proper stage is highly desirable in order to expose the lower bolls, which luxuriant plants make inaccessible to sunlight needed for the ripening process. In addition, defoliation of the cotton plant leaves enables cotton picking to be made much more efficiently either by hand or by machine. Defoliation of cotton has additional advantages, for example, the removal of the cotton plant leaves causes a reduction in the number of bolls and thereby reduces the food supply available to the boll weevil prior to its entering a state of hibernation. As a consequence, there is a definite reduction in the number of such pests which are able to live through the winter months and emerge to do subsequent damage. Also of economic importance is the defoliation of fruit trees (peach, citrus, plum, apple, and other fruit trees) as well as other types of trees and shrubs. By such defoliation the maturity of the plant or its fruit is forced and makes for more efficient production and/or growing. Likewise, food plants such as string beans, soya, beans and other vegetable crop plants are frequently subjected to defoliation in order to make harvesting easier.

It has now been found, in accord with this invention, that the defoliation of plants may be obtained by treating said plants with a defoliative amount of a compound having the structure R—NCS where R is a saturated hydrocarbon radical containing up to about eighteen carbon atoms. Surprisingly, the alkyl isothiocyanates which contain less than 12 carbon atoms or which contain aliphatic unsaturation are much less active as defoliants. The preferred embodiment of the invention, which represents a surprisingly superior class, are those saturated alkyl isothiocyanates containing from 12 to 18 carbon atoms.

The procedures that will be used for applying the defoliant compositions to the plants will be in accord with the usual practices. Since the active compositions will generally have limited water solubility, they will be applied to the plants as an aqueous dispersion or emulsion. When an organic system is employed the organic solvent will generally be an aromatic hydrocarbon solvent such as xylene or toluene. Any conventional solvent system may be used as for example, ketones (methyl ethyl ketone, acetone, cyclohexanone, etc.), petroleum oils, aliphatic amides such as dimethylformamide, dimethylacetamide, keto alcohols (e.g. diacetone alcohol), and the like.

In the preferred embodiment of the invention, a concentrate of the active agent in an organic solvent will be manufactured and sold as an article of commerce. This concentrate is simply diluted with water just prior to use to form an aqueous dispersion of the active agent and the dispersion is readily sprayed by any of the conventional techniques onto the foliage of the plant to be treated. In general, the concentrate of the active agent will contain from about 5 to 50% by weight of agent, the balance being an organic solvent and a surfactant such as an alkylarylpolyether alcohol, an organic sulfonate, or other type of surfactant which will enable the formulation to be readily dispersed into an aqueous system. In use, the concentrate will be added to water with agitation so that the concentration of active agent in the aqueous dispersion will be between about 0.1% and 30% and this aqueous system is then immediately ready for application to the plant. The concentrate can also be diluted with a suitable oil for spray application.

Alternatively, the active agent may be placed on a solid carrier rather than in the liquid carrier as described above. Solid carriers may be applied directly to the plant by dusting, or they may be applied in the form of wettable or dispersible powders which likewise may be added to aqueous or organic solvent systems for application by conventional spray techniques. The concentration of active agent on the carrier will likewise vary between about 5% and 50% by weight of the total composition.

The rate of application of the active agent onto the crop to be treated will vary between about 0.5 and 20 lbs. of active agent per acre. Lower rates can be used on more sensitive plants, such as beans, while higher amounts can be used on less sensitive crops such as cotton and woody plants.

As indicated by the structure given above, the active agents for use in the process of this invention are alkyl isothiocyanates and these are known compounds which are readily prepared by the oxidative cleavage of the corresponding dithiocarbamate salts which in turn are prepared from the corresponding primary amine. (See for example E. Schmidt and L. Fehr, Ann., vol. 621, p. 1, 1959.) In order to more clearly and fully illustrate the invention, the following examples are given.

EXAMPLE I.—FORMULATIONS USEFUL AS DEFOLIANTS:

(A) *Aqueous grinding*

Ten parts by weight of dodecyl isothiocyanate and 90 parts by weight of water are ball milled in the presence of an alkyl arylpolyether alcohol surfactant until a stable dispersion was obtained.

(B) *Aqueous dispersion from ketone solution concentrates*

Ten parts by weight of octadecyl isothiocyanate was dissolved in 85 parts by weight in acetone and 5 parts by weight of an alkyl arylpolyether alcohol surfactant ("Triton" X-155). This formulation was a clear, homogeneous liquid which was stable to storage and useful as an article of commerce. For use, the concentrate is added to a water or oil carrier to give a liquid formulation ready for spraying onto the foliage of plants.

(C) *Hydrocarbon concentrate*

Ten parts by weight of octadecyl isothiocyanate was dissolved in 85 parts of xylene and 5 parts of surfactant ("Triton" X-155) was added. The clear homogeneous liquid was storage stable and ready for use by addition to water to give a sprayable dispersion of the active agent.

(D) *Wettable powder*

| | Percent |
|---|---|
| Hexadecyl isothiocyanate | 50 |
| Surfactants: | |
|   "Marasperse" N | 2 |
|   Igepon | 2 |
| Attapulgite carrier ("Attaclay") | 46 |

EXAMPLE II.—EVALUATION

Plant response data for the defoliants were obtained by spraying formulations on two week old black valentine beans at rates ranging from 0.1 to 20 lbs. per acre and the plant response effect observed over a three week period.

The following Table I indicates the results obtained.

TABLE I.—DEFOLIANT ACTIVITY OF R–NCS ON BLACK VALENTINE BEANS APPLIED AS AQUEOUS DISPERSION FROM XYLENE CONCENTRATE

| Compound (R=): | Defoliation effects |
|---|---|
| n-Butyl | Some defoliant activity at 20 lbs. per acre. |
| Octyl | No activity at 0.1 and 1 lb. per acre; 50% defoliation after 21 days at 10 lbs./acre. |
| Undecyl | No activity at 0.1 and 1 lb. per acre; 100% defoliation at 10 lbs./acre after 14 days; 100% desiccation at 10 lbs./acre in 1 day. |
| Dodecyl | 50% defoliation at 1 lb./acre after 14 days. |
| Hexadecyl | 25% defoliation at 1 lb./acre after 4 days; 100% defoliation at 1 lb./acre after 21 days. |
| Octadecyl | 50% defoliation at 0.1 lb./acre after 7 days. |

EXAMPLE III

A mixture consisting essentially of hexadecyl and octadecyl isothiocyanate prepared from soya amine was evaluated as in Example II and showed activity (12.5% defoliation) at 1 lb. per acre in 21 days on black valentine beans.

EXAMPLE IV

An alkyl isothiocyanate mixture prepared from a mixture containing 20% hexadecylamine, 17% octadecylamine, 26% octadecenylamine, and 37% octadecyldienylamine (from tallowamine) showed activity on black valentine beans at 10 lbs. per acre, but not at 0.1 and 1 lbs. per acre.

EXAMPLE V

When decyl isothiocyanate and tetradecyl isothiocyanate are used to treat plants as in Example II, defoliant and desiccant effects are observed.

It will be understood that numerous changes and variations may be made from the above description and examples without departing from the spirit and scope of the invention.

I claim:
1. The process of treating plants to obtain a defoliative effect which comprises contacting said plants with a defoliating amount of a material characterized by the structure R—NCS where R is an alkyl radical containing 10 to 18 carbon atoms.
2. The process of claim 1 wherein the active agent is decyl isothiocyanate.
3. The process of claim 1 wherein the active agent is dodecyl isothiocyanate.
4. The process of claim 1 wherein the active agent is tetradecyl isothiocyanate.
5. The process of claim 1 where the active agent is hexadecyl isothiocyanate.
6. The process of claim 1 where the active agent is octadecyl isothiocyanate.
7. The process of claim 1 where the active agent is a mixture of alkyl isothiocyanates containing 10 to 18 carbon atoms in the alkyl group.

References Cited

UNITED STATES PATENTS

| 2,824,887 | 2/1958 | Klopping | 260—454 |
| 2,903,347 | 8/1959 | Boyd | 71—2.7 |

FOREIGN PATENTS

| 1,384,275 | 11/1964 | France. |
| 7,749 | 6/1963 | Japan. |

OTHER REFERENCES

Schmidt et al., Ann. 621, 1–7 (1959).

LEWIS GOTTS, *Primary Examiner.*

M. KASSENOFF, *Assistant Examiner.*